United States Patent
Xu et al.

(10) Patent No.: US 11,528,105 B2
(45) Date of Patent: Dec. 13, 2022

(54) CONTROL CHANNEL MONITORING BASED ON SUB-CARRIER SPACING

(71) Applicant: QUALCOMM Incorporated, San Diego, CA (US)

(72) Inventors: Huilin Xu, San Diego, CA (US); Peter Pui Lok Ang, San Diego, CA (US); Aamod Khandekar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 179 days.

(21) Appl. No.: 17/028,652

(22) Filed: Sep. 22, 2020

(65) Prior Publication Data

US 2021/0105105 A1     Apr. 8, 2021

Related U.S. Application Data

(60) Provisional application No. 62/909,980, filed on Oct. 3, 2019.

(51) Int. Cl.
*H04L 5/00* (2006.01)
*H04L 5/14* (2006.01)
*H04W 72/04* (2009.01)
*H04W 72/12* (2009.01)

(52) U.S. Cl.
CPC ............. *H04L 5/001* (2013.01); *H04L 5/006* (2013.01); *H04L 5/0064* (2013.01); *H04L 5/0094* (2013.01); *H04L 5/14* (2013.01); *H04W 72/042* (2013.01); *H04W 72/0446* (2013.01); *H04W 72/1289* (2013.01)

(58) Field of Classification Search
CPC ....... H04L 5/001; H04L 5/006; H04L 5/0064; H04L 5/0094; H04L 5/14; H04W 72/042; H04W 72/0446; H04W 72/1289
USPC ....................................................... 370/329
See application file for complete search history.

(56) References Cited

U.S. PATENT DOCUMENTS 11,336,420 B2 *  5/2022  Kazmi ................. H04L 1/1642

OTHER PUBLICATIONS

Huawei, et al., "UE Feature Discussion for Cross-Carrier Scheduling with Different Numerologies", 3GPP TSG RANWG1 Meeting #98, 3GPP Draft; R1-1909311, 3rd Generation Partnership Project (3GPP), Mobile Competence Centre, 650, Route Des Lucioles, F-06921 Sophia-Antipolis Cedex, France, vol. RAN WG1, No. Prague, Czech Republic; Aug. 26, 2019-Aug. 30, 2019, Aug. 17, 2019 (Aug. 17, 2019), 10 Pages, XP051765918, Retrieved from the Internet: URL: http://www.3gpp.org/ftp/tsg_ran/WG1_RL1/TSGR1_98/Docs/R1-1909311.zip [retrieved on Aug. 17, 2019].
International Search Report and Written Opinion—PCT/US2020/052247—ISA/EPO—dated Jan. 27, 2021.

(Continued)

*Primary Examiner* — Peter G Solinsky
(74) *Attorney, Agent, or Firm* — Patterson + Sheridan, LLP

(57) ABSTRACT

Certain aspects of the present disclosure provide techniques for supporting control channel monitoring based on sub-carrier spacing (SCS).

30 Claims, 9 Drawing Sheets

(56) References Cited

OTHER PUBLICATIONS

Qualcomm Incorporated: "Remaining Issues on Cross-Carrier Scheduling with Different Numerologies", 3GPP TSG-RANWG1 #98, 3GPP Draft; R1-1909469 Remaining Issues on Cross-Carrier Scheduling With Different Numerologies, 3rd Generation Partnership Project (3GPP), Mobile Competence Centre; 650, Route Des Lucioles; F-06921, vol. RAN WG1, No. Prague, Czech Republic; Aug. 26, 2019-Aug. 30, 2019, Aug. 25, 2019, 6 Pages, XP051759809.

ZTE Corporation: "Discussion on Cross-Carrier Scheduling with Different Numerologies", 3GPP TSGRAN WG1 Meeting #96, 3GPP Draft; R1-1901777 Discussion on Cross-Carrier Scheduling With Different Numerologies, 3rd Generation Partnership Project (3GPP), Mobile Competence Centre, 650, Route Des Lucioles; F-06921 Sophia, vol. RAN WG1, No. Athens, Greece; Feb. 25, 2019-Mar. 1, 2019, Feb. 16, 2019, 7 Pages, XP051599471.

* cited by examiner

Span Pattern with X=7, Y=3

Span Pattern with X=4, Y=3

Span Pattern with X=2, Y=2

CONTROL CHANNEL MONITORING BASED ON SUB-CARRIER SPACING

CROSS-REFERENCE TO RELATED APPLICATION(S)

This application claims benefit of and priority to U.S. Provisional Application No. 62/909,980, filed Oct. 3, 2019, which is hereby assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and more particularly, to techniques for control channel monitoring.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipment (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects relate to a method of wireless communication by a user equipment (UE). The method includes signaling to a serving cell one or more sets of UE capabilities of the UE. Each of the one or more sets of UE capabilities indicates a number of supported spans per slot for monitoring a control channel transmitted by a scheduling cell for scheduling one or more of uplink or downlink communication by the UE with one or more scheduled cells. Each of the one or more sets of UE capabilities further indicates a number of supported downlink control indicators (DCIs) in the control channel per span per scheduled cell. The one or more sets of UE capabilities are for each of: same sub-carrier spacing (SCS) scheduling comprising one or more of the control channel scheduling communication by the UE with the scheduling cell or the control channel scheduling communication by the UE with at least one scheduled cell having a same SCS as an SCS of the scheduling cell; lower SCS scheduling comprising the control channel scheduling communication by the UE with at least one scheduled cell having a lower SCS than the SCS of the scheduling cell; and higher SCS scheduling comprising the control channel scheduling communication by the UE with at least one scheduled cell having a higher SCS than the SCS of the scheduling cell. The method further includes monitoring the control channel according to the one or more sets of UE capabilities.

Certain aspects relate to a method of wireless communication by a network comprising one or more cells serving a user equipment (UE). The method includes receiving, by a serving cell, signaling of one or more sets of UE capabilities of the UE. Each of the one or more sets of UE capabilities indicates a number of supported spans per slot for monitoring a control channel transmitted by a scheduling cell for scheduling one or more of uplink or downlink communication by the UE with one or more scheduled cells. Each of the one or more sets of UE capabilities further indicates a number of supported downlink control indicators (DCIs) in the control channel per span per scheduled cell. The one or more sets of UE capabilities are for each of: same sub-carrier spacing (SCS) scheduling comprising one or more of the control channel scheduling communication by the UE with the scheduling cell or the control channel scheduling communication by the UE with at least one scheduled cell having a same SCS as an SCS of the scheduling cell; lower SCS scheduling comprising the control channel scheduling communication by the UE with at least one scheduled cell having a lower SCS than the SCS of the scheduling cell; and higher SCS scheduling comprising the control channel scheduling communication by the UE with at least one scheduled cell having a higher SCS than the SCS of the scheduling cell. The method further includes communicating with the UE according to the one or more sets of UE capabilities.

Certain aspects relate to a user equipment (UE) comprising a memory and a processor coupled to the memory. The memory and processor are configured to signal to a serving cell one or more sets of UE capabilities of the UE. Each of the one or more sets of UE capabilities indicates a number of supported spans per slot for monitoring a control channel transmitted by a scheduling cell for scheduling one or more of uplink or downlink communication by the UE with one or more scheduled cells. Each of the one or more sets of UE capabilities further indicates a number of supported downlink control indicators (DCIs) in the control channel per span per scheduled cell. The one or more sets of UE capabilities are for each of: same sub-carrier spacing (SCS) scheduling comprising one or more of the control channel scheduling communication by the UE with the scheduling cell or the control channel scheduling communication by the UE with at least one scheduled cell having a same SCS as an SCS of the scheduling cell; lower SCS scheduling comprising the control channel scheduling communication by the UE with at least one scheduled cell having a lower SCS than the SCS of the scheduling cell; and higher SCS scheduling comprising the control channel scheduling communication by the UE with at least one scheduled cell having a higher SCS than the SCS of the scheduling cell. The memory and processor are further configured to monitor the control channel according to the one or more sets of UE capabilities.

Certain aspects relate to a serving cell of a network comprising one or more cells serving a user equipment (UE). The serving cell includes a memory and a processor coupled to the memory. The memory and processor are configured to receive signaling of one or more sets of UE capabilities of the UE. Each of the one or more sets of UE capabilities indicates a number of supported spans per slot for monitoring a control channel transmitted by a scheduling cell for scheduling one or more of uplink or downlink communication by the UE with one or more scheduled cells. Each of the one or more sets of UE capabilities further indicates a number of supported downlink control indicators (DCIs) in the control channel per span per scheduled cell. The one or more sets of UE capabilities are for each of: same sub-carrier spacing (SCS) scheduling comprising one or more of the control channel scheduling communication by the UE with the scheduling cell or the control channel scheduling communication by the UE with at least one scheduled cell having a same SCS as an SCS of the scheduling cell; lower SCS scheduling comprising the control channel scheduling communication by the UE with at least one scheduled cell having a lower SCS than the SCS of the scheduling cell; and higher SCS scheduling comprising the control channel scheduling communication by the UE with at least one scheduled cell having a higher SCS than the SCS of the scheduling cell. The memory and processor are further configured to communicate with the UE according to the one or more sets of UE capabilities.

Certain aspects relate to a user equipment (UE). The UE includes means for signaling to a serving cell one or more sets of UE capabilities of the UE. Each of the one or more sets of UE capabilities indicates a number of supported spans per slot for monitoring a control channel transmitted by a scheduling cell for scheduling one or more of uplink or downlink communication by the UE with one or more scheduled cells. Each of the one or more sets of UE capabilities further indicates a number of supported downlink control indicators (DCIs) in the control channel per span per scheduled cell. The one or more sets of UE capabilities are for each of: same sub-carrier spacing (SCS) scheduling comprising one or more of the control channel scheduling communication by the UE with the scheduling cell or the control channel scheduling communication by the UE with at least one scheduled cell having a same SCS as an SCS of the scheduling cell; lower SCS scheduling comprising the control channel scheduling communication by the UE with at least one scheduled cell having a lower SCS than the SCS of the scheduling cell; and higher SCS scheduling comprising the control channel scheduling communication by the UE with at least one scheduled cell having a higher SCS than the SCS of the scheduling cell. The UE further includes means for monitoring the control channel according to the one or more sets of UE capabilities.

Certain aspects relate to a serving cell of a network comprising one or more cells serving a user equipment (UE). The serving cell includes means for receiving signaling of one or more sets of UE capabilities of the UE. Each of the one or more sets of UE capabilities indicates a number of supported spans per slot for monitoring a control channel transmitted by a scheduling cell for scheduling one or more of uplink or downlink communication by the UE with one or more scheduled cells. Each of the one or more sets of UE capabilities further indicates a number of supported downlink control indicators (DCIs) in the control channel per span per scheduled cell. The one or more sets of UE capabilities are for each of: same sub-carrier spacing (SCS) scheduling comprising one or more of the control channel scheduling communication by the UE with the scheduling cell or the control channel scheduling communication by the UE with at least one scheduled cell having a same SCS as an SCS of the scheduling cell; lower SCS scheduling comprising the control channel scheduling communication by the UE with at least one scheduled cell having a lower SCS than the SCS of the scheduling cell; and higher SCS scheduling comprising the control channel scheduling communication by the UE with at least one scheduled cell having a higher SCS than the SCS of the scheduling cell. The serving cell further includes means for communicating with the UE according to the one or more sets of UE capabilities.

Certain aspects relate to a non-transitory computer readable medium that stores instructions that, when executed by a user equipment (UE), cause the UE to perform a method of wireless communication. The method includes signaling to a serving cell one or more sets of UE capabilities of the UE. Each of the one or more sets of UE capabilities indicates a number of supported spans per slot for monitoring a control channel transmitted by a scheduling cell for scheduling one or more of uplink or downlink communication by the UE with one or more scheduled cells. Each of the one or more sets of UE capabilities further indicates a number of supported downlink control indicators (DCIs) in the control channel per span per scheduled cell. The one or more sets of UE capabilities are for each of: same sub-carrier spacing (SCS) scheduling comprising one or more of the control channel scheduling communication by the UE with the scheduling cell or the control channel scheduling communication by the UE with at least one scheduled cell having a same SCS as an SCS of the scheduling cell; lower SCS scheduling comprising the control channel scheduling communication by the UE with at least one scheduled cell having a lower SCS than the SCS of the scheduling cell; and higher SCS scheduling comprising the control channel scheduling communication by the UE with at least one scheduled cell having a higher SCS than the SCS of the scheduling cell. The method further includes monitoring the control channel according to the one or more sets of UE capabilities.

Certain aspects relate to a non-transitory computer readable medium that stores instructions that, when executed by a serving cell of a network comprising one or more cells serving a user equipment (UE), cause the serving cell to perform a method of wireless communication. The method includes receiving signaling of one or more sets of UE capabilities of the UE. Each of the one or more sets of UE capabilities indicates a number of supported spans per slot for monitoring a control channel transmitted by a scheduling cell for scheduling one or more of uplink or downlink communication by the UE with one or more scheduled cells. Each of the one or more sets of UE capabilities further indicates a number of supported downlink control indicators (DCIs) in the control channel per span per scheduled cell. The one or more sets of UE capabilities are for each of: same sub-carrier spacing (SCS) scheduling comprising one or more of the control channel scheduling communication by the UE with the scheduling cell or the control channel scheduling communication by the UE with at least one scheduled cell having a same SCS as an SCS of the scheduling cell; lower SCS scheduling comprising the control channel scheduling communication by the UE with at least one scheduled cell having a lower SCS than the SCS of the scheduling cell; and higher SCS scheduling comprising the control channel scheduling communication by the UE with at least one scheduled cell having a higher SCS than the SCS of the scheduling cell. The method further includes communicating with the UE according to the one or more sets of UE capabilities.

Aspects of the present disclosure provide means for, apparatus, processors, and computer-readable mediums for performing the methods described herein.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
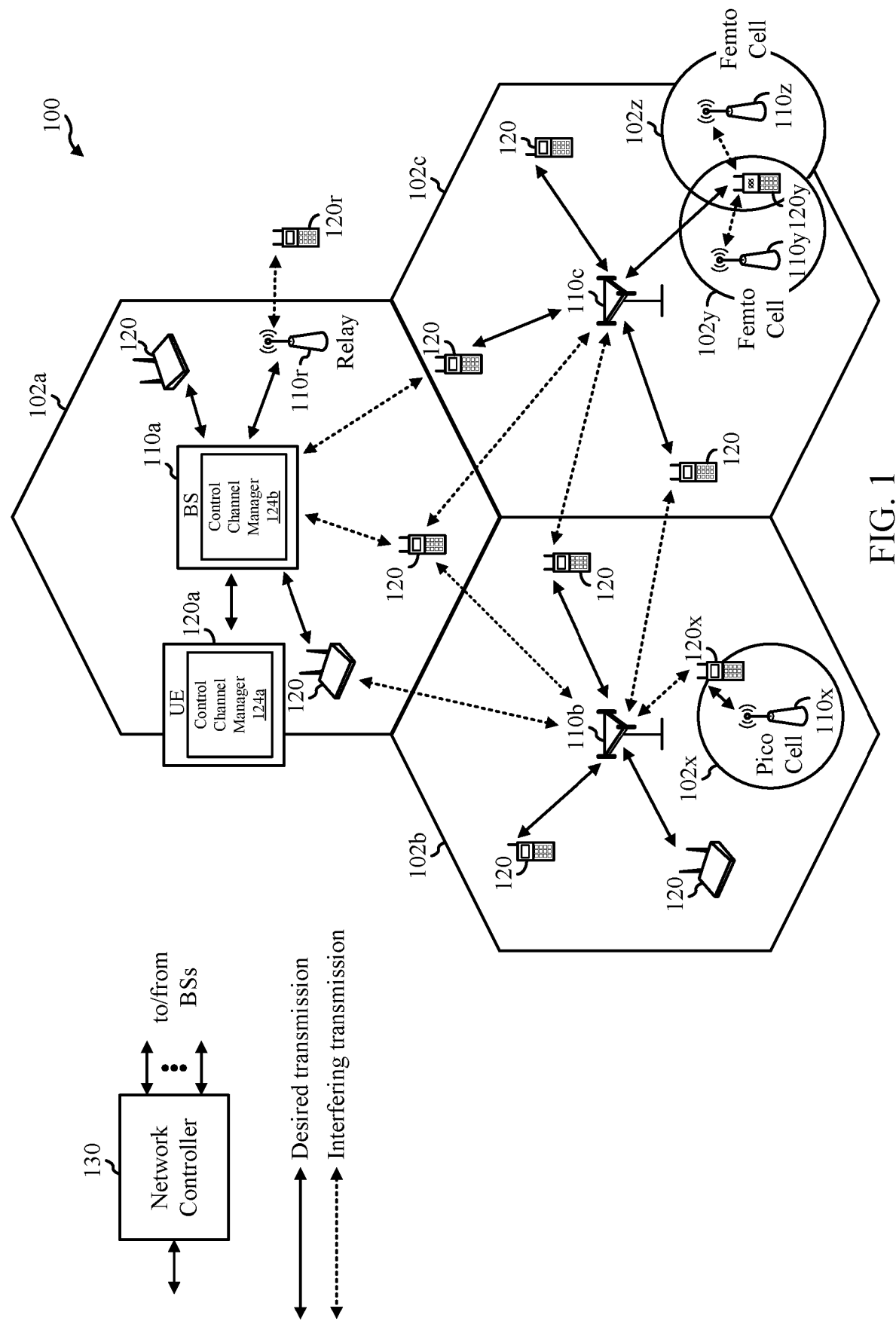
FIG. 1 is a block diagram conceptually illustrating an example telecommunications system, in accordance with certain aspects of the present disclosure.

Aspects of the present disclosure provide apparatus, methods, processing systems, and computer readable mediums for supporting control channel monitoring based on sub-carrier spacing (SCS).

In wireless communication systems that utilize carrier aggregation (CA) with cross-carrier scheduling, a cell (e.g., a base station (BS) serving the cell) known as a scheduling cell may schedule (e.g., schedule communications on one or more communication resources (e.g., time, frequency, spatial, code, etc.)) one or more other cells (e.g., one or more BSs serve the other cells, which may be the same or different than the BS serving the scheduling cell), known as scheduled cells. The scheduling cell and other cells may serve a UE, and be referred to as serving cells of the UE. The scheduling cell and other cells may use different carrier frequencies for communication, hence the term cross-carrier scheduling. In certain aspects, up to eight (8) cells may be scheduled by a scheduling cell. In these systems, the sub-carrier spacing (SCS) (i.e., frequency spacing between sub-carrier frequencies in a symbol) of the scheduling cell communications (e.g., uplink and/or downlink transmissions) may be the same or different from the SCS of the scheduled cell communications.

For example, the scheduling cell might have an SCS of 30 kHz, whereas one or more (e.g., all) of the scheduled cells might have an SCS of 120 kHz. Such a scenario where the scheduled cell has a higher SCS than the SCS of the scheduling cell may be referred to herein as higher SCS cross-carrier scheduling or higher SCS scheduling.

In another example, the scheduling cell might have an SCS of 120 kHz, whereas one or more (e.g., all) of the scheduled cells might have an SCS of 30 kHz. Such a scenario where the scheduled cell has a lower SCS than the SCS of the scheduling cell may be referred to herein as lower SCS cross-carrier scheduling or lower SCS scheduling.

In yet another example, the scheduling cell might have an SCS of 30 kHz and one or more (e.g., all) of the scheduled cells might also have an SCS of 30 kHz. Such a scenario where the scheduled cell has the same SCS as the SCS of the scheduling cell may be referred to herein as same SCS cross-carrier scheduling. Further, the scheduling cell might schedule communication on the scheduling cell itself (i.e., the scheduling cell is also the scheduled cell), which may be referred to herein as self-scheduling. Self-scheduling and same SCS cross-carrier scheduling may both be referred to as same SCS scheduling.

The scheduling cell is configured to transmit a control channel that schedules communications in the one or more scheduled cells, such as for one or more UEs. For example, in certain aspects, the control channel is a physical downlink control channel (PDCCH) that is used to schedule uplink transmissions on one or more physical uplink shared channel (PUSCH) and/or downlink transmissions on one or more physical downlink shared channel (PDSCH) in the scheduled cell(s). In certain aspects, the PDCCH includes one or more downlink control indicators (DCIs). In certain aspects, each DCI indicates a grant of uplink resources (UL grant) or a grant of downlink resources (DL grant) for a UE for communicating in a particular scheduled cell.

In certain aspects, the UE monitors the control channel, receives the one or more DCIs, and decodes the one or more DCIs to determine scheduling in the one or more scheduled cells. In cases of SCS disparity (i.e., lower SCS scheduling or higher SCS scheduling), however, the SCS difference may affect the ability of the UE to timely decode the PDCCH and prepare traffic for transmission on the PUSCH and/or decode traffic on the PDSCH, such as before having to transmit a requisite acknowledgement/negative-acknowledgment (ACK/NACK) report at a specified time on one or more uplink channels.

For example, the SCS has an effect on the number of symbols, such as OFDM symbols, within a subframe. In particular, as SCS gets wider or greater, the slot length will become shorter. For example, a 15 kHz SCS (i.e., spacing parameter $\mu=0$ in known spacing numerology where the SCS or frequency spacing $\Delta f$ is determined by the equation $\Delta f = 2 \times 15$ kHz) would result in one 1 ms slot, which could also constitute an entire 1 ms subframe. Further, a 120 kHz SCS (i.e., spacing parameter $\mu=3$ in known spacing numerology) would result in 8 slots having a duration of 1 ms/8 or 0.125 ms in the 1 ms subframe, corresponding to slot 0 through slot 7.

Based on the SCS used in a scheduling cell and the SCS used in a scheduled cell, a UE may be able to support different control channel monitoring configurations. A control channel monitoring configuration may accommodate or correspond to, for example, a number (e.g., one or more) of supported spans (e.g., separate time spans as described further herein) per slot for monitoring the control channel by the UE. A control channel monitoring configuration, in addition, may accommodate or correspond to, for example, a number (e.g., one or more) of supported DCIs in the control channel per span per scheduled cell. In some examples, the number of supported DCIs refers to the number of all DCIs. In some examples, the number of supported DCIs refers to the number of unicast DCIs. In some examples, the number of supported DCIs refers to the number of unicast DCIs scheduling DL and/or the number of unicast DCIs scheduling UL.

Accordingly, certain aspects herein provide techniques for supporting different control channel monitoring configurations based on the SCS used in a scheduling cell and the SCS used in a scheduled cell. For example, certain aspects provide techniques for a UE to signal (e.g., by signaling one or more sets of UE capabilities) which control channel monitoring configuration(s) it supports for which scheduling scenario (e.g., lower SCS scheduling, higher SCS scheduling, and same SCS scheduling) to one or more serving cells. Further, certain aspects provide techniques for the UE and one or more cells to communicate in accordance with the control channel monitoring configuration(s) based on the scheduling scenario.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed including supporting control channel monitoring based on SCS. For example, the wireless communication network 100 may be a New Radio (NR) or 5G network.

As illustrated in FIG. 1, the wireless network 100 may include a number of base stations (BSs) 110 and other network entities. A BS may be a station that communicates with user equipment (UEs). Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, a single BS may serve multiple cells, such as on different carrier frequencies. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

According to certain aspects, the UEs 120 may be configured for supporting control channel monitoring based on SCS. As shown in FIG. 1, the UE 120a includes a control channel manager 124a configured to control UE 120a to support control channel monitoring based on SCS according to aspects discussed herein.

According to certain aspects, the BSs 110 may be configured for supporting control channel monitoring based on SCS. As shown in FIG. 1, the BS 110a includes a control channel manager 124b configured to control BS 110a to support control channel monitoring based on SCS according to aspects discussed herein.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a sub-band, etc. Each frequency may support a single RAT in a given geographic area in order to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smartjewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time-domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into sub-bands. For example, a sub-band may cover 1.8 MHz (i.e., 6 resource blocks), and there may be 1, 2, 4, 8, or 16 sub-bands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled. A scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS (e.g., scheduling cell and/or scheduled cell), which is a BS designated to serve the UE on the downlink and/or uplink. A finely dashed line with double arrows indicates interfering transmissions between a UE and a BS.

Figure 2:
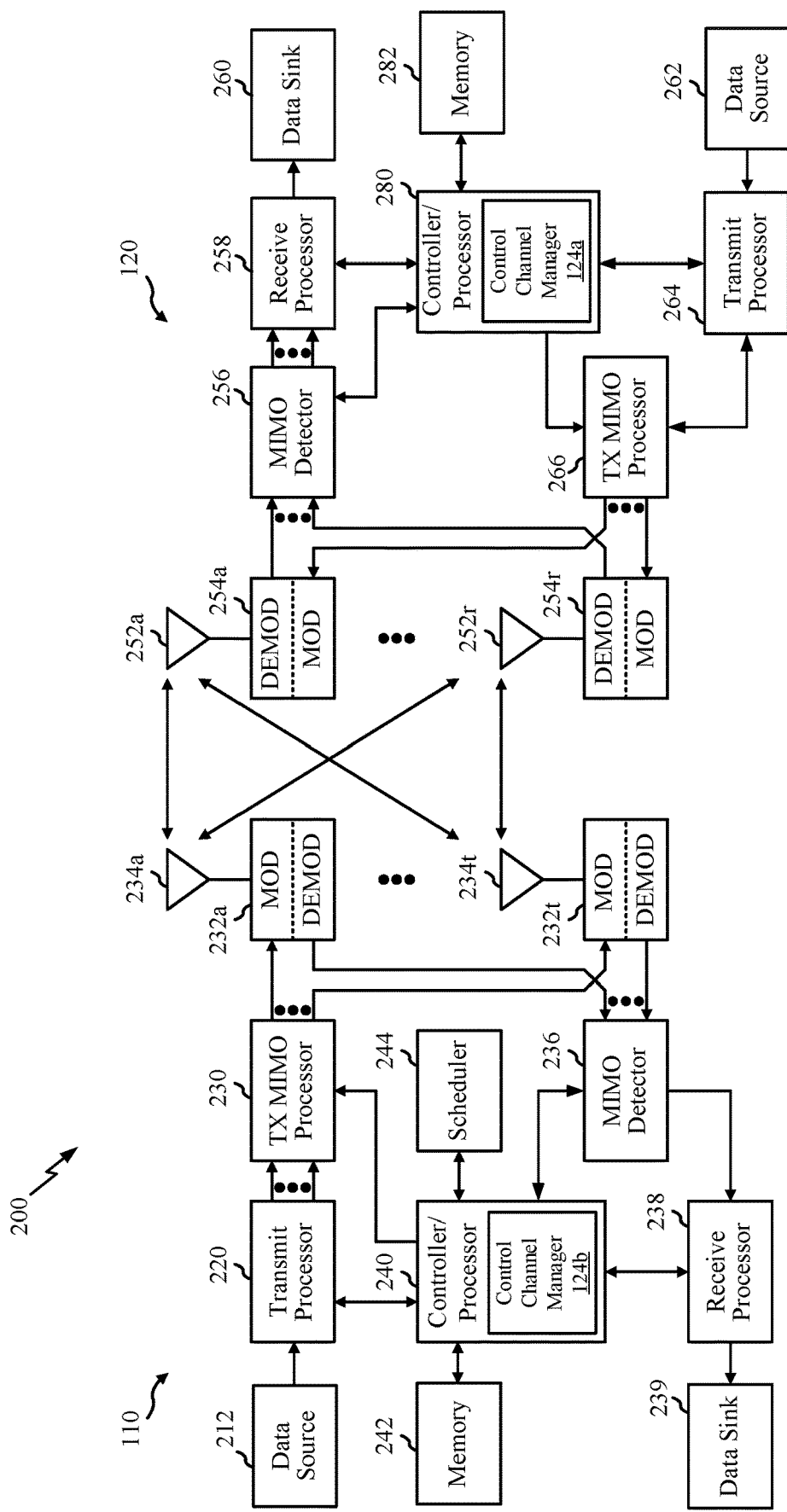
FIG. 2 is a block diagram conceptually illustrating a design of an example base station (BS) and user equipment (UE), in accordance with certain aspects of the present disclosure.

FIG. 2 illustrates example components of BS 110 and UE 120 (as depicted in FIG. 1), which may be used to implement aspects of the present disclosure. For example, antennas 252, processors 266, 258, 264, and/or controller/processor 280 of the UE 120 and/or antennas 234, processors 220, 260, 238, and/or controller/processor 240 of the BS 110 may be used to perform the various techniques and methods described herein.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The processor 220 may also generate reference symbols, e.g., for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232*a* through 232*t*. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232*a* through 232*t* may be transmitted via the antennas 234*a* through 234*t*, respectively.

At the UE 120, the antennas 252*a* through 252*r* may receive the downlink signals from the base station 110 and may provide received signals to the demodulators (DE-MODs) in transceivers 254*a* through 254*r*, respectively. Each demodulator 254 may condition (e.g., filter, amplify, down-convert, and digitize) a respective received signal to obtain input samples. Each demodulator may further process the input samples (e.g., for OFDM, etc.) to obtain received symbols. A MIMO detector 256 may obtain received symbols from all the demodulators 254*a* through 254*r*, perform MIMO detection on the received symbols if applicable, and provide detected symbols. A receive processor 258 may process (e.g., demodulate, de-interleave, and decode) the detected symbols, provide decoded data for the UE 120 to a data sink 260, and provide decoded control information to a controller/processor 280.

On the uplink, at UE 120, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a through 254r (e.g., for SC-FDM, etc.), and transmitted to the base station 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The controllers/processors 240 and 280 may direct the operation at the base station 110 and the UE 120, respectively. The processor 240 and/or other processors and modules at the BS 110 may perform or direct the execution of processes for the techniques described herein. The memories 242 and 282 may store data and program codes for BS 110 and UE 120, respectively. A scheduler 244 may schedule UEs for data transmission on the downlink and/or uplink.

The controller/processor 280 and/or other processors and modules at the UE 120 may perform or direct the execution of processes for the techniques described herein. As shown in FIG. 2, the controller/processor 280 of the UE 120 includes the control channel manager 124a. The controller/processor 240 and/or other processors and modules at the BS 110 may perform or direct the execution of processes for the techniques described herein. As shown in FIG. 2, the controller/processor 240 of the BS 110 includes the control channel manager 124b.

Although shown at the controller/processor, other components of the UE 120 and BS 110 may be used for performing the operations described herein.

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 3:
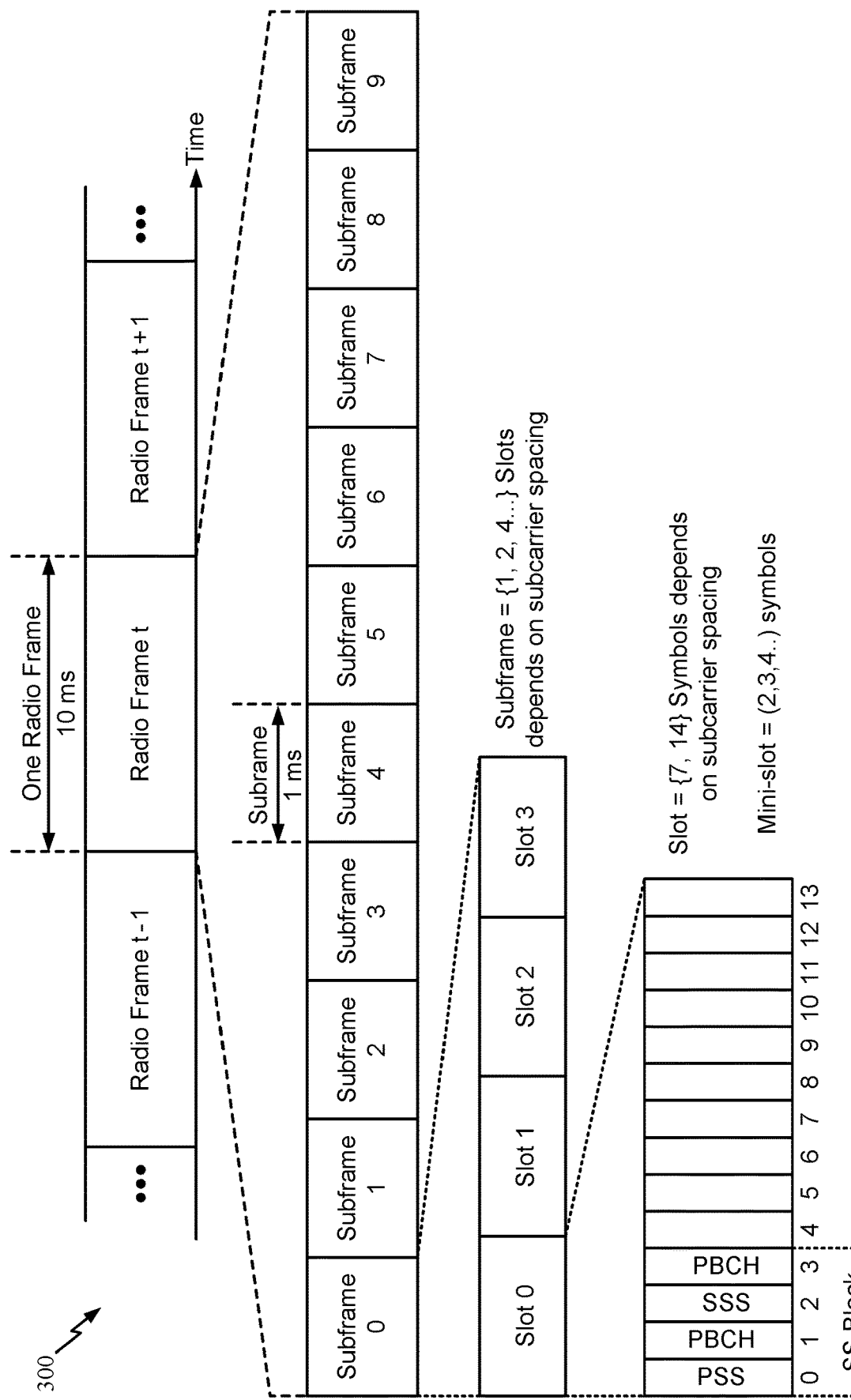
FIG. 3 illustrates an example of a frame format for a new radio (NR) system, in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Control Channel Monitoring Based on SCS

In certain aspects, a slot includes one or more spans (e.g., control channel symbol segments corresponding to time instances) that can be used to communicate a control channel (e.g., PDCCH). In certain aspects, a span conforms to the following properties (e.g., as described in 3GPP TS 38.822 hereby incorporated by reference). In certain aspects, each span has a length of up to Y consecutive symbols of a slot. In certain aspects, there is a minimum time separation of X symbols (e.g., including across slots) between the start of two spans. In certain aspects, spans do not overlap. In certain aspects, every span is contained in a single slot. In certain aspects, the same span pattern repeats in every slot. In certain aspects, the separation between consecutive spans within and across slots may be unequal but the same (X, Y) limit must be satisfied by all spans. In certain aspects, every control channel monitoring occasion is fully contained in one span.

In certain aspects, a suitable span pattern can be determined by first generating a bitmap $b(l)$, $0 \leq l \leq 13$, where b(l)=1 if symbol l of any slot is part of a monitoring occasion, and otherwise b(l)=0. The first span in the span pattern begins at the smallest l for which b(l)=1. The next span in the span pattern begins at the smallest l not included in the previous span(s) for which b(l)=1.

In certain aspects, the span duration is max{maximum value of all CORESET durations, minimum value of Y in the UE reported candidate values} except possibly the last span in a slot which can be of shorter duration.

In certain aspects, a UE, such as UE 120, is configured to send signaling (e.g., capability signaling) to a serving cell (e.g., BS 110, corresponding to a scheduling cell and/or a scheduled cell) indicating one or more monitoring configurations it supports for control channel (e.g., PDCCH) monitoring. For example, the UE is configured to send a set of UE capabilities (e.g., using RRC signaling) to the serving cell. As discussed herein, a given set of UE capabilities may correspond to one or more given scheduling scenarios (e.g., one or more of higher SCS scheduling, lower SCS scheduling, or same SCS scheduling). Accordingly, in certain aspects, UE 120 is configured to transmit multiple sets of UE capabilities to the serving cell, each set corresponding to one or more given scheduling scenarios (e.g., one or more of higher SCS scheduling, lower SCS scheduling, or same SCS scheduling). In certain aspects, different capabilities of a given set of UE capabilities are reported separately to the serving cell by the UE 120. In certain aspects, multiple capabilities of a given set of UE capabilities are reported together to the serving cell by the UE 120.

For example, a set of UE capabilities may include a first UE capability indicating a number (e.g., one or more) of spans per slot the UE is capable of monitoring the control channel. Further, the set of UE capabilities may include a second UE capability indicating one or more numbers (e.g., one or more) of DCIs the UE is capable of processing per span per scheduled cell, where the number of DCIs may refer to the number of all DCIs, the number of all unicast DCIs scheduling DL or UL, the number of unicast DCIs scheduling DL and/or number of unicast DCIs scheduling UL.

In certain aspects, for same SCS scheduling, a UE is capable of processing one unicast DCI scheduling DL (e.g., PDSCH) and one unicast DCI scheduling UL (e.g., PUSCH) per scheduled cell (e.g., component carrier (CC)) across the set of monitoring occasions in a span for frequency division duplex (FDD) communications. In certain aspects, for same SCS scheduling, a UE is capable of processing one unicast DCI scheduling DL and two unicast DCI scheduling UL per scheduled cell (e.g., component carrier (CC)) across the set of monitoring occasions in a span for time division duplex (TDD) communications. In certain aspects, for same SCS scheduling, a UE is capable of processing two unicast DCI scheduling DL and one unicast DCI scheduling UL per scheduled cell (e.g., component carrier (CC)) across the set of monitoring occasions in a span for TDD communications.

In certain aspects, a particular control channel monitoring configuration meets the limitations of a set of UE capabilities if the span arrangement satisfies the gap separation for at least one (X,Y) in the UE reported candidate value set in every slot (e.g., including across slot boundaries). For example, the UE 120 may report a candidate value set of (X,Y) values to the serving cell. In one example, the UE 120 may report a set with the following candidate value only: (7,3). In another example, the UE 120 may report a set with the following candidate values: (7,3) and (4,3). In yet another example, the UE 120 may report a set with the following candidate values: (7,3), (4,3), and (2,2).

Figure 4A:
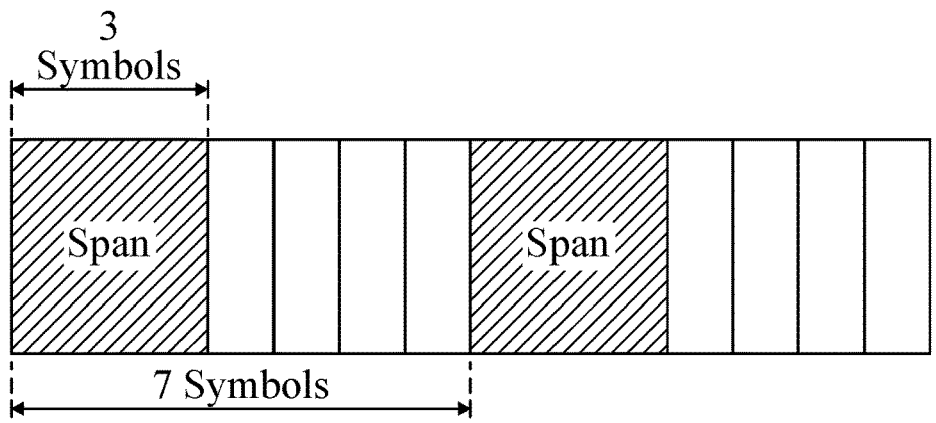
FIGS. 4A-4C illustrate example span patterns in a slot, in accordance with certain aspects of the present disclosure.
Figure 4B:
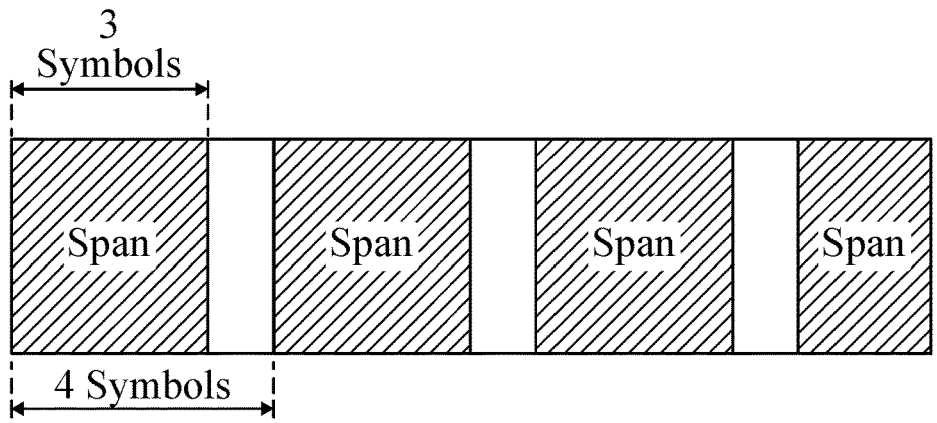
Figure 4C:
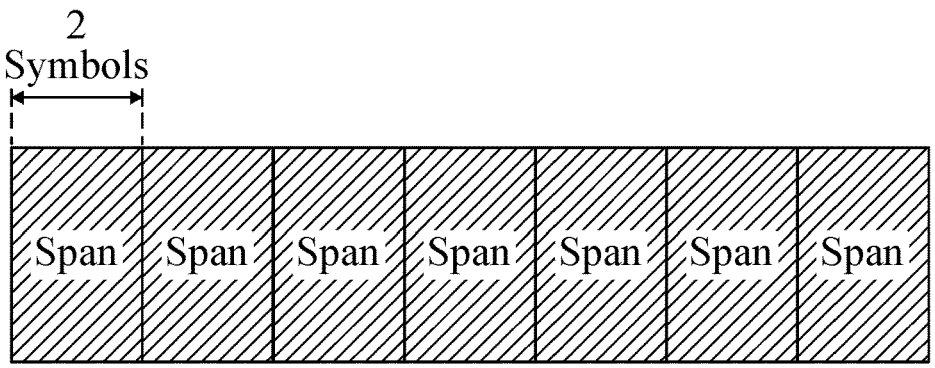

FIGS. 4A-4C illustrate example span patterns in a slot. For example, FIG. 4A illustrates an example span pattern for a (X,Y) value equal to (X=7, Y=3). Further, FIG. 4B illustrates an example span pattern for a (X,Y) value equal to (X=4, Y=3). Further, FIG. 4C illustrates an example span pattern for a (X,Y) value equal to (X=2, Y=2).

In certain aspects, based on the set of UE capabilities reported by UE 120 to the serving cell for a given scheduling scenario, the UE 120 and scheduling cell communicate. For example, the UE 120 and the scheduling cell may communicate one or more DCIs in the one or more spans of a control channel monitoring configuration that correspond to the set of UE capabilities. For example, the UE 120 and serving cell may determine which scheduling scenario corresponds to communication of the UE 120 based on which cells are serving the UE 120, and may accordingly determine a corresponding control channel monitoring configuration based on the corresponding set of UE capabilities reported by UE 120 to the serving cell.

Figure 5A:
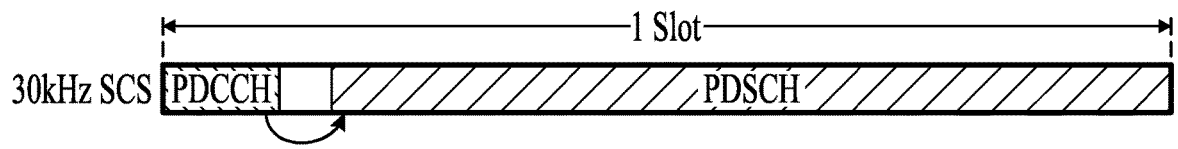
FIGS. 5A-5D illustrate example scheduling scenarios, in accordance with certain aspects of the present disclosure.
Figure 5B:
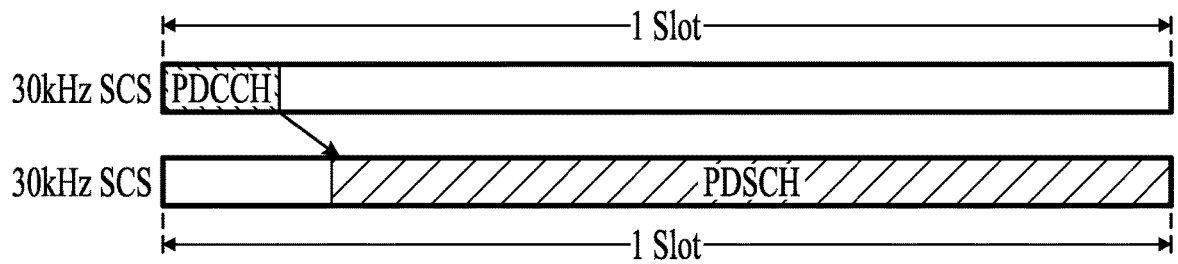
Figure 5C:
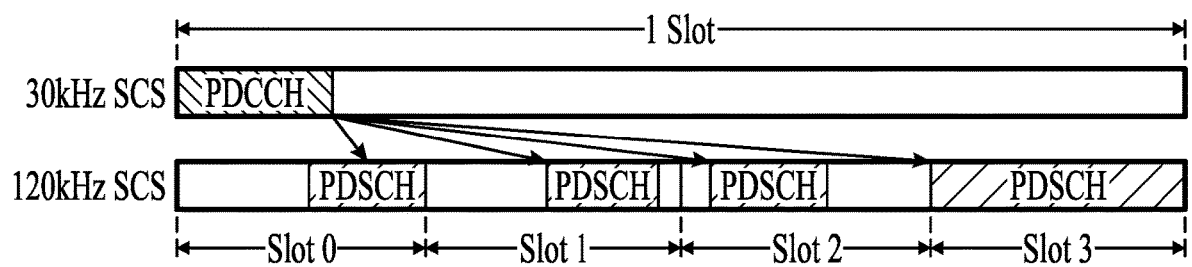
Figure 5D:
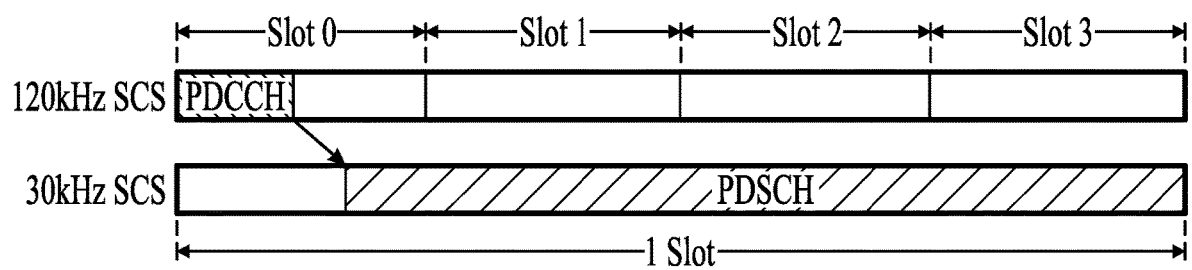

FIGS. 5A-5D illustrate example scheduling scenarios. For example, FIG. 5A illustrates an example of self-scheduling, FIG. 5B illustrates an example of same SCS cross-carrier scheduling, FIG. 5C illustrates an example of higher SCS cross-carrier scheduling, and FIG. 5D illustrates an example of lower SCS cross-carrier scheduling.

In certain aspects, for lower SCS scheduling, UE 120 (and in a complementary fashion the scheduling cell) is configured (e.g., based on UE capability report) to support and/or perform control channel monitoring in less than or equal to the number (e.g., one or more) of spans in a slot on the scheduling cell as supported for same SCS scheduling.

In certain aspects, for lower SCS scheduling, UE 120 (and in a complementary fashion the scheduling cell) is configured (e.g., based on UE capability report) to support and/or perform control channel monitoring in an equal number (e.g., one or more) of spans in a slot on the scheduling cell as supported for same SCS scheduling.

In certain aspects, for lower SCS scheduling, UE 120 (and in a complementary fashion the scheduling cell) is configured (e.g., based on UE capability report) to support and/or perform control channel monitoring in less than the number (e.g., one or more) of spans in a slot on the scheduling cell as supported for same SCS scheduling.

In certain aspects, for same SCS scheduling, UE 120 (and in a complementary fashion the scheduling cell) is configured (e.g., based on UE capability report) to support and/or perform control channel monitoring in less than or equal to the number (e.g., one or more) of spans in a slot on the scheduling cell as supported for higher SCS scheduling.

In certain aspects, for same SCS scheduling, UE 120 (and in a complementary fashion the scheduling cell) is configured (e.g., based on UE capability report) to support and/or perform control channel monitoring in an equal number (e.g., one or more) of spans in a slot on the scheduling cell as supported for higher SCS scheduling.

In certain aspects, for same SCS scheduling, UE 120 (and in a complementary fashion the scheduling cell) is configured (e.g., based on UE capability report) to support and/or perform control channel monitoring in less than the number (e.g., one or more) of spans in a slot on the scheduling cell as supported for higher SCS scheduling.

In certain aspects, for lower SCS scheduling, UE 120 (and in a complementary fashion the scheduling cell) is configured (e.g., based on UE capability report) to support and/or perform control channel monitoring where in each of one or more spans in a slot on the scheduling cell UE 120 supports less than or equal to the number (e.g., one or more) of DCIs as supported for same SCS scheduling (e.g., maximum number of unicast DCIs scheduling DL per scheduled CC for FDD, maximum number of unicast DCIs scheduling DL per scheduled CC for TDD, maximum number of unicast DCIs scheduling UL per scheduled CC for FDD, and/or maximum number of unicast DCIs scheduling UL per scheduled CC for TDD).

In certain aspects, for lower SCS scheduling, UE 120 (and in a complementary fashion the scheduling cell) is configured (e.g., based on UE capability report) to support and/or perform control channel monitoring where in each of one or more spans in a slot on the scheduling cell UE 120 supports an equal number (e.g., one or more) of DCIs as supported for same SCS scheduling (e.g., maximum number of unicast DCIs scheduling DL per scheduled CC for FDD, maximum number of unicast DCIs scheduling DL per scheduled CC for TDD, maximum number of unicast DCIs scheduling UL per scheduled CC for FDD, and/or maximum number of unicast DCIs scheduling UL per scheduled CC for TDD).

In certain aspects, for lower SCS scheduling, UE 120 (and in a complementary fashion the scheduling cell) is configured (e.g., based on UE capability report) to support and/or perform control channel monitoring where in each of one or more spans in a slot on the scheduling cell UE 120 supports less than the number (e.g., one or more) of DCIs as supported for same SCS scheduling (e.g., maximum number of unicast DCIs scheduling DL per scheduled CC for FDD, maximum number of unicast DCIs scheduling DL per scheduled CC for TDD, maximum number of unicast DCIs scheduling UL per scheduled CC for FDD, and/or maximum number of unicast DCIs scheduling UL per scheduled CC for TDD).

In certain aspects, for same SCS scheduling, UE 120 (and in a complementary fashion the scheduling cell) is configured (e.g., based on UE capability report) to support and/or perform control channel monitoring where in each of one or more spans in a slot on the scheduling cell UE 120 supports less than or equal to the number (e.g., one or more) of DCIs as supported for higher SCS scheduling (e.g., maximum number of unicast DCIs scheduling DL per scheduled CC for FDD, maximum number of unicast DCIs scheduling DL per scheduled CC for TDD, maximum number of unicast DCIs scheduling UL per scheduled CC for FDD, and/or maximum number of unicast DCIs scheduling UL per scheduled CC for TDD).

In certain aspects, for same SCS scheduling, UE 120 (and in a complementary fashion the scheduling cell) is configured (e.g., based on UE capability report) to support and/or perform control channel monitoring where in each of one or more spans in a slot on the scheduling cell UE 120 supports an equal number (e.g., one or more) of DCIs as supported for higher SCS scheduling (e.g., maximum number of unicast DCIs scheduling DL per scheduled CC for FDD, maximum number of unicast DCIs scheduling DL per scheduled CC for TDD, maximum number of unicast DCIs scheduling UL per scheduled CC for FDD, and/or maximum number of unicast DCIs scheduling UL per scheduled CC for TDD).

In certain aspects, for same SCS scheduling, UE 120 (and in a complementary fashion the scheduling cell) is configured (e.g., based on UE capability report) to support and/or perform control channel monitoring where in each of one or more spans in a slot on the scheduling cell UE 120 supports less than the number (e.g., one or more) of DCIs as supported for higher SCS scheduling (e.g., maximum number of unicast DCIs scheduling DL per scheduled CC for FDD, maximum number of unicast DCIs scheduling DL per scheduled CC for TDD, maximum number of unicast DCIs scheduling UL per scheduled CC for FDD, and/or maximum number of unicast DCIs scheduling UL per scheduled CC for TDD).

In certain aspects, UE 120 supports separate capability signaling to indicate the support of control channel monitoring for each of higher SCS scheduling, lower SCS scheduling, and same SCS scheduling. For example, in certain aspects, UE 120 supports and/or signals a first set of UE capabilities for higher SCS scheduling, a second set of UE capabilities for lower SCS scheduling, and a third set of UE capabilities for same SCS scheduling. For example, in certain aspects, UE 120 supports separate capability signaling to indicate UE 120 supports PDCCH monitoring in a single span in a slot on the scheduling cell for lower SCS scheduling, UE 120 supports PDCCH monitoring in multiple spans in a slot on the scheduling cell for a higher SCS scheduling, and UE 120 supports PDCCH monitoring in multiple spans in a slot on the scheduling cell for same SCS scheduling. For example, in certain aspects, UE 120 supports separate capability signaling to indicate UE 120 supports processing 1 DCI scheduling DL and 1 DCI scheduling UL for FDD in each span in a slot on the scheduling cell for lower SCS scheduling, UE 120 supports processing 2 DCIs scheduling DL and 2 DCIs scheduling UL for FDD in each span in a slot on the scheduling cell for a higher SCS scheduling, and UE 120 supports processing 1 DCI scheduling DL and 1 DCI scheduling UL for FDD in each span in a slot on the scheduling cell for same SCS scheduling.

In certain aspects, UE 120 supports one capability signaling to indicate the support of control channel monitoring for both lower SCS scheduling and same SCS scheduling, and a separate capability signaling to indicate the support of control channel monitoring for higher SCS scheduling. For example, in certain aspects, UE 120 supports and/or signals a first set of UE capabilities that applies to both lower SCS scheduling and same SCS scheduling, and a second set of UE capabilities for higher SCS scheduling. For example, in certain aspects, UE 120 supports separate capability signaling to indicate UE 120 supports PDCCH monitoring in a single span in a slot on the scheduling cell for both lower SCS scheduling and same SCS scheduling, and UE 120 supports PDCCH monitoring in multiple spans in a slot on the scheduling cell for a higher SCS scheduling. For example, in certain aspects, UE 120 supports separate capability signaling to indicate UE 120 supports processing 1 DCI scheduling DL and 1 DCI scheduling UL for FDD in each span in a slot on the scheduling cell for both lower SCS scheduling and same SCS scheduling, and UE 120 supports processing 2 DCIs scheduling DL and 2 DCIs scheduling UL for FDD in each span in a slot on the scheduling cell for a higher SCS scheduling.

In certain aspects, UE 120 supports one capability signaling to indicate the support of control channel monitoring for both higher SCS scheduling and same SCS scheduling, and a separate capability signaling to indicate the support of control channel monitoring for lower SCS scheduling. For example, in certain aspects, UE 120 supports and/or signals a first set of UE capabilities that applies to both higher SCS scheduling and same SCS scheduling, and a second set of UE capabilities for lower SCS scheduling. For example, in certain aspects, UE 120 supports separate capability signaling to indicate UE 120 supports PDCCH monitoring in multiple spans in a slot on the scheduling cell for both higher SCS scheduling and same SCS scheduling, and UE 120 supports PDCCH monitoring in a single span in a slot on the scheduling cell for a lower SCS scheduling. For example, in certain aspects, UE 120 supports separate capability signaling to indicate UE 120 supports processing 2 DCIs scheduling DL and 2 DCIs scheduling UL for FDD in each span in a slot on the scheduling cell for both higher SCS scheduling and same SCS scheduling, and UE 120 supports processing 1 DCI scheduling DL and 1 DCI scheduling UL for FDD in each span in a slot on the scheduling cell for a lower SCS scheduling.

In certain aspects, UE 120 supports one capability signaling to indicate the support of control channel monitoring for both lower SCS scheduling and higher SCS scheduling, and a separate capability signaling to indicate the support of control channel monitoring for same SCS scheduling. For example, in certain aspects, UE 120 supports and/or signals a first set of UE capabilities that applies to both lower SCS scheduling and higher SCS scheduling, and a second set of UE capabilities for same SCS scheduling.

Figure 6:
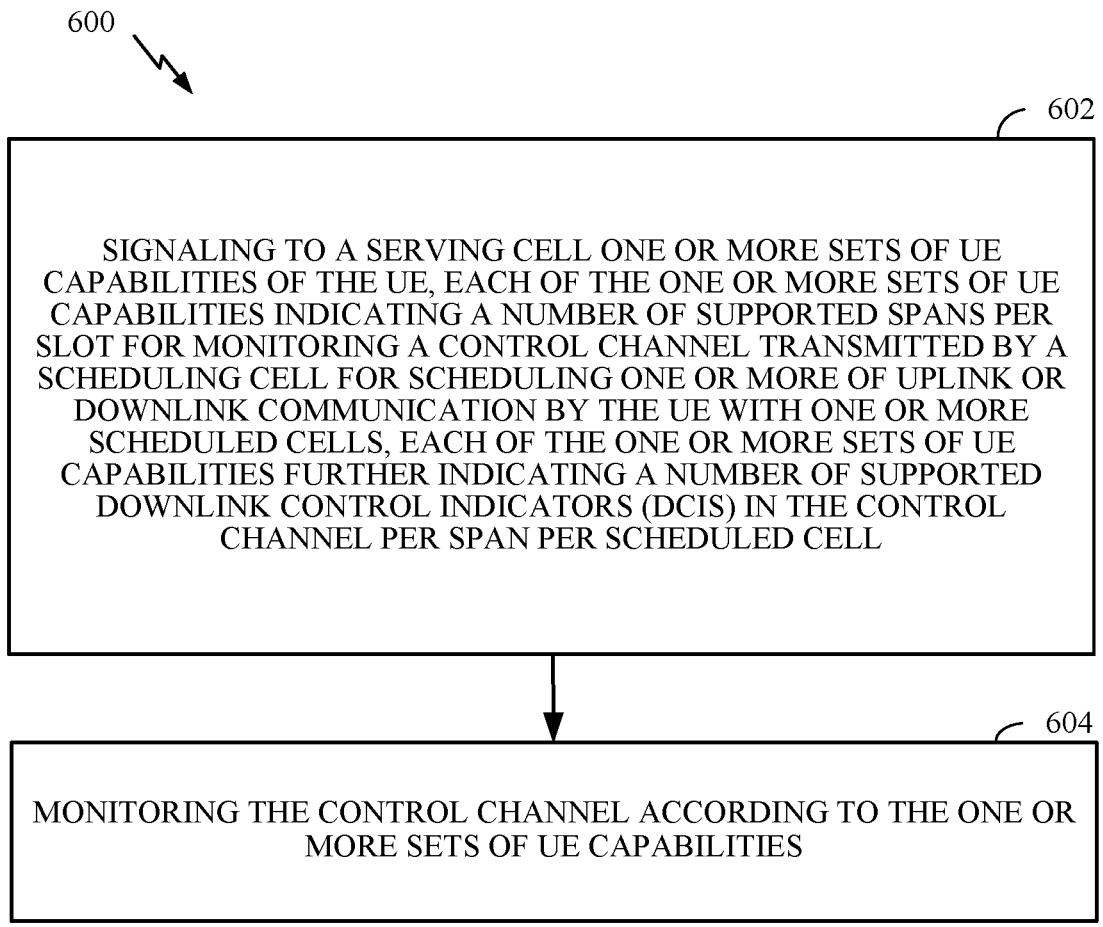
FIG. 6 shows operations of a method of wireless communication performed at a UE in accordance with certain aspects of the disclosure.

FIG. 6 shows operations 600 of a method of wireless communication performed by a UE in accordance with certain aspects of the disclosure. Operations 600 begin at block 602 by a UE signaling to a serving cell one or more sets of UE capabilities of the UE. Each of the one or more sets of UE capabilities indicates a number of supported spans per slot (e.g., of the scheduling cell) for monitoring a control channel transmitted by a scheduling cell for scheduling one or more of uplink or downlink communication by the UE with one or more scheduled cells. Each of the one or more sets of UE capabilities further indicates a number of supported downlink control indicators (DCIs) in the control channel per span per scheduled cell. The one or more sets of UE capabilities are for each of: same sub-carrier spacing (SCS) scheduling comprising one or more of the control channel scheduling communication by the UE with the scheduling cell or the control channel scheduling communication by the UE with at least one scheduled cell having a same SCS as an SCS of the scheduling cell; lower SCS scheduling comprising the control channel scheduling communication by the UE with at least one scheduled cell having a lower SCS than the SCS of the scheduling cell; and higher SCS scheduling comprising the control channel scheduling communication by the UE with at least one scheduled cell having a higher SCS than the SCS of the scheduling cell.

Further, at block 604, the UE monitors the control channel according to the one or more sets of UE capabilities.

Figure 7:
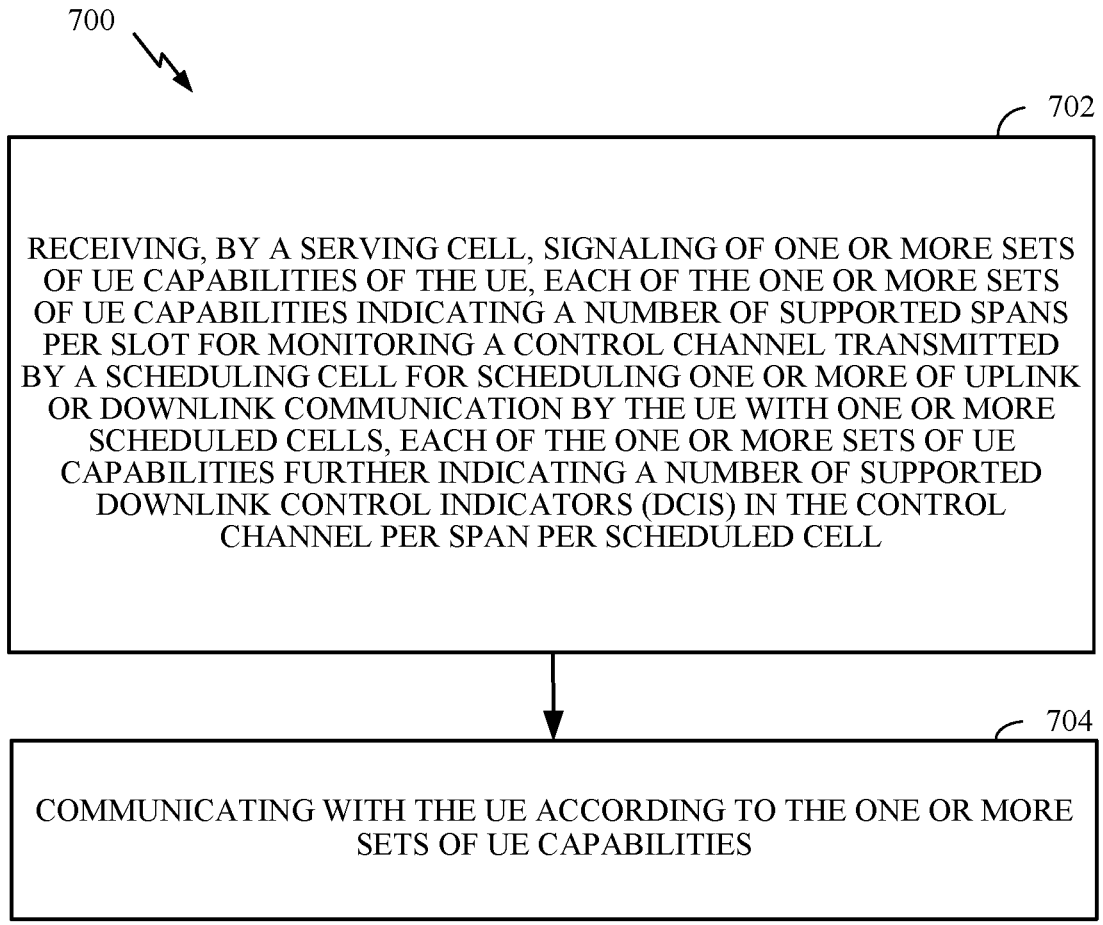
FIG. 7 shows operations of a method of wireless communication performed at a network entity (e.g., BS) in accordance with certain aspects of the disclosure.

FIG. 7 shows operations 700 of a method of wireless communication performed by a network (e.g., by BS, serving cell, scheduling cell, etc.) comprising one or more cells serving a user equipment (UE) in accordance with certain aspects of the disclosure. Operations 700 begin at block 702 by receiving, by a serving cell, signaling of one or more sets of UE capabilities of the UE. Each of the one or more sets of UE capabilities indicates a number of supported spans per slot (e.g., of the scheduling cell) for monitoring a control channel transmitted by a scheduling cell for scheduling one or more of uplink or downlink communication by the UE with one or more scheduled cells. Each of the one or more sets of UE capabilities further indicates a number of supported downlink control indicators (DCIs) in the control channel per span per scheduled cell. The one or more sets of UE capabilities are for each of: same sub-carrier spacing (SCS) scheduling comprising one or more of the control channel scheduling communication by the UE with the scheduling cell or the control channel scheduling communication by the UE with at least one scheduled cell having a same SCS as an SCS of the scheduling cell; lower SCS scheduling comprising the control channel scheduling communication by the UE with at least one scheduled cell having a lower SCS than the SCS of the scheduling cell; and higher SCS scheduling comprising the control channel scheduling communication by the UE with at least one scheduled cell having a higher SCS than the SCS of the scheduling cell.

Further, at block 704, the scheduling cell communicates with the UE according to the one or more sets of UE capabilities.

In certain aspects of operations 600 and/or 700, the one or more sets of UE capabilities comprises a separate set of UE capabilities for each of same SCS scheduling, lower SCS scheduling, and higher SCS scheduling.

In certain aspects of operations 600 and/or 700, the one or more sets of UE capabilities comprises a first set of UE capabilities for both same SCS scheduling and lower SCS scheduling and a second set of UE capabilities for higher SCS scheduling.

In certain aspects of operations 600 and/or 700, the one or more sets of UE capabilities comprises a first set of UE capabilities for both higher SCS scheduling and lower SCS scheduling and a second set of UE capabilities for same SCS scheduling.

In certain aspects of operations 600 and/or 700, the one or more sets of UE capabilities comprises a first set of UE capabilities for both same SCS scheduling and higher SCS scheduling and a second set of UE capabilities for same SCS scheduling.

In certain aspects of operations 600 and/or 700, the one or more sets of UE capabilities indicates a first number of supported spans per slot of the scheduling cell for same SCS scheduling and a second number of supported spans per slot for lower SCS scheduling, wherein the second number is less than or equal to the first number. In certain such aspects, the second number is equal to the first number. In certain such aspects, the second number is less than the first number.

In certain aspects of operations 600 and/or 700, the one or more sets of UE capabilities indicates a first number of supported spans per slot of the scheduling cell for higher SCS scheduling and a second number of supported spans per slot for same SCS scheduling, wherein the second number is less than or equal to the first number. In certain such aspects, the second number is equal to the first number. In certain such aspects, the second number is less than the first number.

In certain aspects of operations 600 and/or 700, the one or more sets of UE capabilities indicates a first number of supported DCIs for same SCS scheduling and a second number of supported DCIs for lower SCS scheduling, wherein the second number is less than or equal to the first number. In certain such aspects, the second number is equal to the first number. In certain such aspects, the second number is less than the first number.

In certain aspects of operations 600 and/or 700, the one or more sets of UE capabilities indicates a first number of supported DCIs for higher SCS scheduling and a second number of supported DCIs for same SCS scheduling, wherein the second number is less than or equal to the first number. In certain such aspects, the second number is equal to the first number. In certain such aspects, the second number is less than the first number.

In certain aspects of operations 600 and/or 700, each of the one or more sets of UE capabilities indicating the number of supported DCIs in the control channel per span per scheduled cell comprises each of the one or more sets of UE capabilities indicating one or more of: a number of supported DCIs in the control channel per span per scheduled cell for downlink scheduling for frequency division duplex (FDD) communication; a number of supported DCIs in the control channel per span per scheduled cell for uplink scheduling for FDD communication; a number of supported DCIs in the control channel per span per scheduled cell for downlink scheduling for time division duplex (TDD) communication; or a number of supported DCIs in the control channel per span per scheduled cell for uplink scheduling for TDD communication. The number of DCIs may refer to the number of all DCIs monitored by the UE, the number of all unicast DCIs scheduling DL or UL, the number of unicast DCIs scheduling DL and/or the number of unicast DCIs scheduling UL.

In certain aspects of operations 600 and/or 700, the control channel comprises a physical downlink control channel, and the one or more of uplink or downlink communication comprises communication on one or more of a physical uplink shared channel or a physical downlink shared channel.

Figure 8:
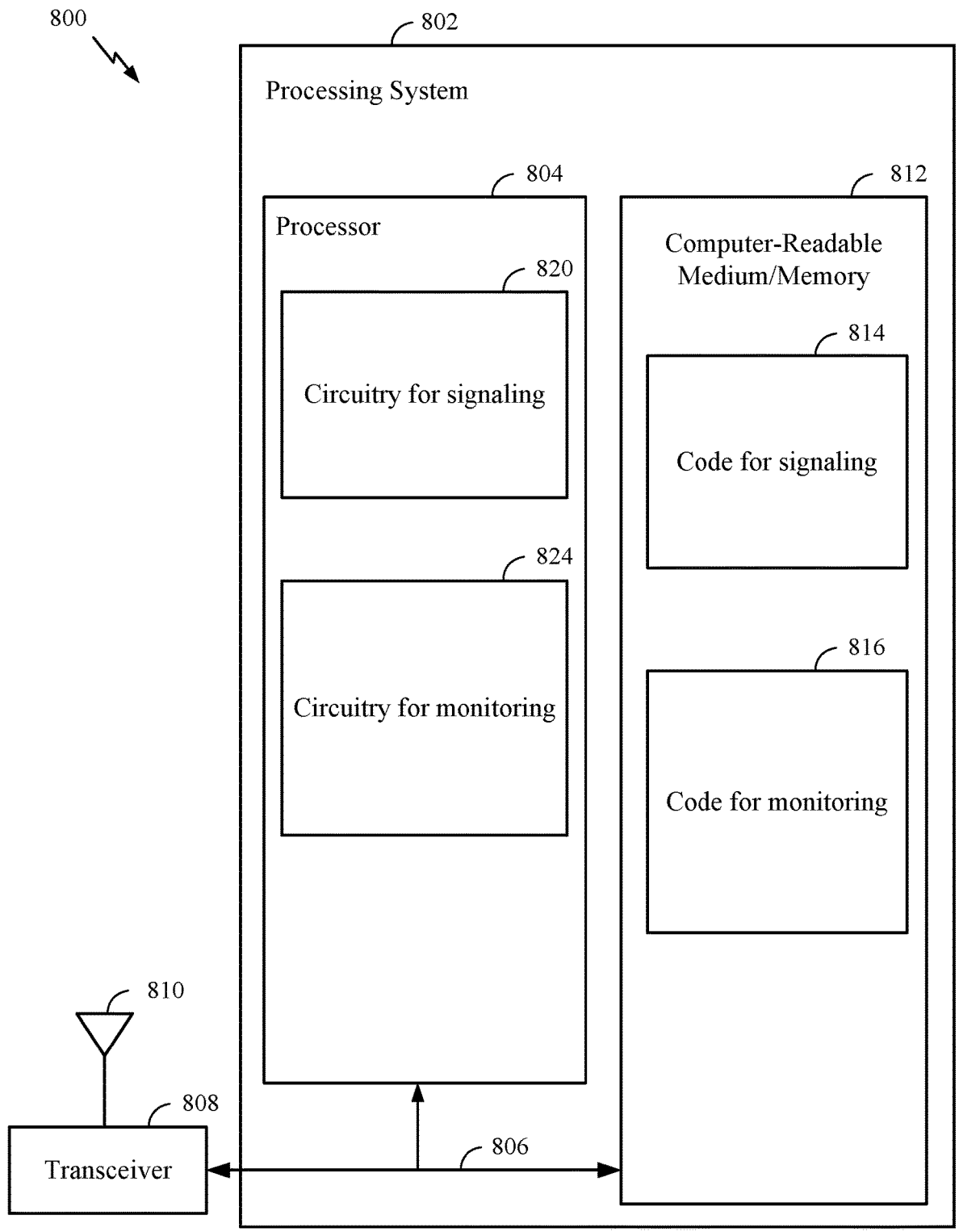
FIG. 8 illustrates a communications device that may include various components configured to perform operations for the techniques disclosed herein, such as the operations illustrated in FIG. 6.

FIG. 8 illustrates a communications device 800 that may include various components (e.g., corresponding to means-plus-function components) configured to perform operations for the techniques disclosed herein, such as the operations illustrated in FIG. 6. The communications device 800 includes a processing system 802 coupled to a transceiver 808. The transceiver 808 is configured to transmit and receive signals for the communications device 800 via an antenna 810, such as the various signals as described herein. The processing system 802 may be configured to perform processing functions for the communications device 800, including processing signals received and/or to be transmitted by the communications device 800.

The processing system 802 includes a processor 804 coupled to a computer-readable medium/memory 812 via a bus 806. In certain aspects, the computer-readable medium/memory 812 is configured to store instructions (e.g., computer-executable code) that when executed by the processor 804, cause the processor 804 to perform the operations illustrated in FIG. 6, or other operations for performing the various techniques discussed herein for supporting control channel monitoring based on SCS. In certain aspects, computer-readable medium/memory 812 stores code 814 for signaling such as in block 602 of FIG. 6 and code 816 for monitoring such as in block 604 of FIG. 6.

In certain aspects, the processor 804 has circuitry configured to implement the code stored in the computer-readable medium/memory 812. The processor 804 includes circuitry 820 for signaling such as in block 602 of FIG. 6 and circuitry 824 for monitoring such as in block 604 of FIG. 6.

Figure 9:
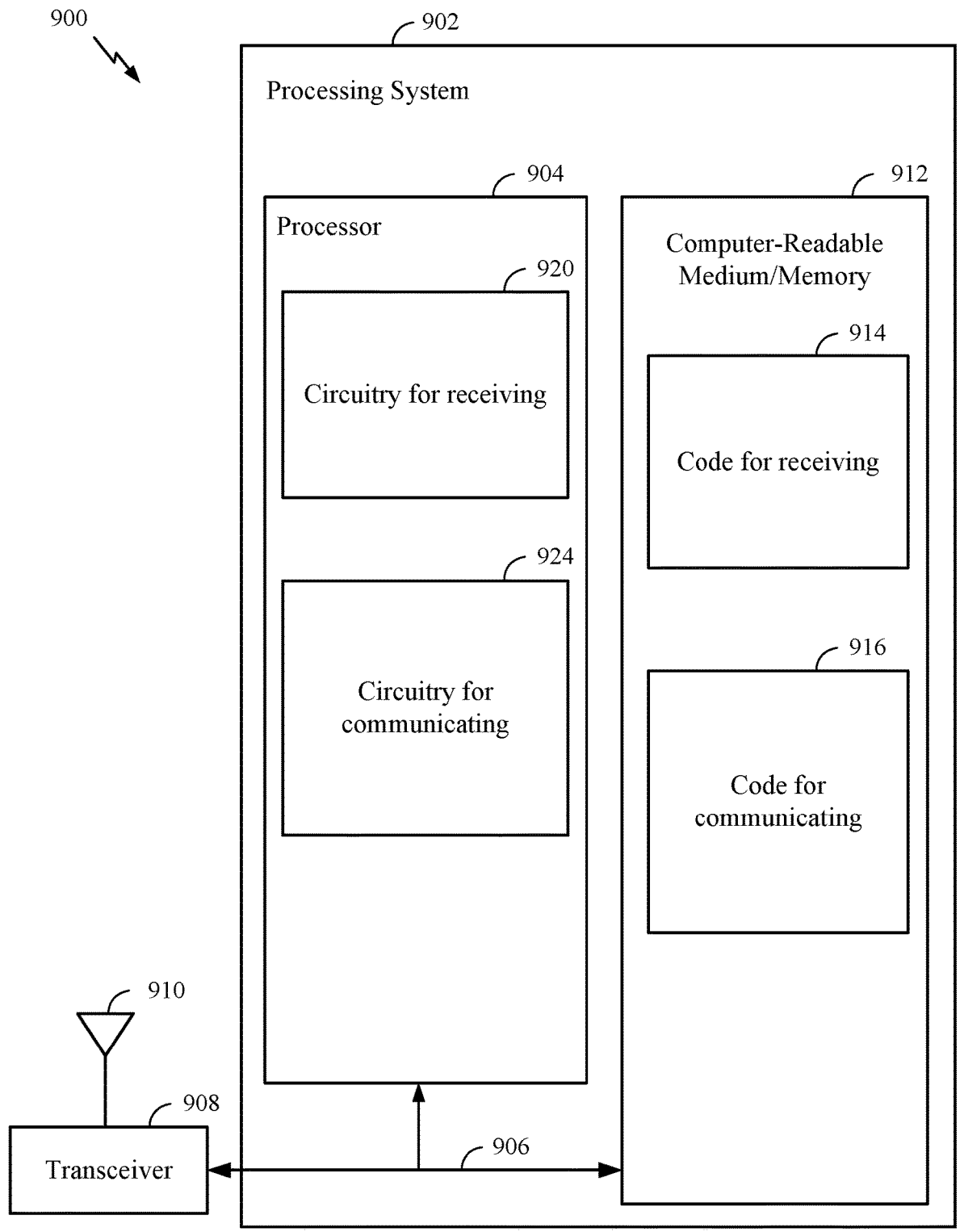
FIG. 9 illustrates a communications device that may include various components configured to perform operations for the techniques disclosed herein, such as the operations illustrated in FIG. 7.

FIG. 9 illustrates a communications device 900 that may include various components (e.g., corresponding to means-plus-function components) configured to perform operations for the techniques disclosed herein, such as the operations illustrated in FIG. 7. The communications device 900 includes a processing system 902 coupled to a transceiver 908. The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions (e.g., computer-executable code) that when executed by the processor 904, cause the processor 904 to perform the operations illustrated in FIG. 7, or other operations for performing the various techniques discussed herein for supporting control channel monitoring based on SCS. In certain aspects, computer-readable medium/memory 912 stores code 914 for receiving such as in block 702 of FIG. 7 and code 916 for communicating such as in block 704 of FIG. 7.

In certain aspects, the processor 904 has circuitry configured to implement the code stored in the computer-readable medium/memory 912. The processor 904 includes circuitry 920 for receiving such as in block 702 of FIG. 7 and circuitry 824 for communicating such as in block 704 of FIG. 7.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription.

A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.8 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 6 and/or 7.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of wireless communication by a user equipment (UE), the method comprising:
   signaling to a serving cell one or more sets of UE capabilities of the UE, each of the one or more sets of UE capabilities indicating a number of supported spans per slot of a scheduling cell for monitoring a control channel transmitted by the scheduling cell for scheduling one or more of uplink or downlink communication by the UE with one or more scheduled cells, each of the one or more sets of UE capabilities further indicating a number of supported downlink control indicators (DCIs) in the control channel per span per scheduled cell, the one or more sets of UE capabilities being for each of:
   same sub-carrier spacing (SCS) scheduling comprising one or more of the control channel scheduling communication by the UE with the scheduling cell or the control channel scheduling communication by the UE with at least one scheduled cell having a same SCS as an SCS of the scheduling cell;
   lower SCS scheduling comprising the control channel scheduling communication by the UE with at least one scheduled cell having a lower SCS than the SCS of the scheduling cell; and
   higher SCS scheduling comprising the control channel scheduling communication by the UE with at least one scheduled cell having a higher SCS than the SCS of the scheduling cell; and
   monitoring the control channel according to the one or more sets of UE capabilities.

2. The method of claim 1, wherein the one or more sets of UE capabilities comprises a separate set of UE capabilities for each of same SCS scheduling, lower SCS scheduling, and higher SCS scheduling.

3. The method of claim 1, wherein the one or more sets of UE capabilities comprises a first set of UE capabilities for both same SCS scheduling and lower SCS scheduling and a second set of UE capabilities for higher SCS scheduling.

4. The method of claim 1, wherein the one or more sets of UE capabilities indicates a first number of supported spans per slot of the scheduling cell for same SCS scheduling and a second number of supported spans per slot for lower SCS scheduling, wherein the second number is less than or equal to the first number.

5. The method of claim 1, wherein the one or more sets of UE capabilities indicates a first number of supported spans per slot of the scheduling cell for higher SCS scheduling and a second number of supported spans per slot for same SCS scheduling, wherein the second number is less than or equal to the first number.

6. The method of claim 1, wherein the one or more sets of UE capabilities indicates a first number of supported DCIs for same SCS scheduling and a second number of supported DCIs for lower SCS scheduling, wherein the second number is less than or equal to the first number.

7. The method of claim 6, wherein the second number is equal to the first number.

8. The method of claim 1, wherein the one or more sets of UE capabilities indicates a first number of supported DCIs for higher SCS scheduling and a second number of supported DCIs for same SCS scheduling, wherein the second number is less than or equal to the first number.

9. The method of claim 1, wherein each of the one or more sets of UE capabilities indicating the number of supported DCIs in the control channel per span per scheduled cell comprises each of the one or more sets of UE capabilities indicating one or more of:
   a number of supported DCIs in the control channel per span per scheduled cell for downlink scheduling for frequency division duplex (FDD) communication;
   a number of supported DCIs in the control channel per span per scheduled cell for uplink scheduling for FDD communication;
   a number of supported DCIs in the control channel per span per scheduled cell for downlink scheduling for time division duplex (TDD) communication; or
   a number of supported DCIs in the control channel per span per scheduled cell for uplink scheduling for TDD communication.

10. The method of claim 1, wherein the number of supported DCIs comprises one of:
   a number of unicast DCIs scheduling downlink; and
   a number of unicast DCIs scheduling uplink.

11. A method of wireless communication by a network comprising one or more cells serving a user equipment (UE), the method comprising:
receiving, by a serving cell, signaling of one or more sets of UE capabilities of the UE, each of the one or more sets of UE capabilities indicating a number of supported spans per slot of a scheduling cell for monitoring a control channel transmitted by the scheduling cell for scheduling one or more of uplink or downlink communication by the UE with one or more scheduled cells, each of the one or more sets of UE capabilities further indicating a number of supported downlink control indicators (DCIs) in the control channel per span per scheduled cell, the one or more sets of UE capabilities being for each of:
same sub-carrier spacing (SCS) scheduling comprising one or more of the control channel scheduling communication by the UE with the scheduling cell or the control channel scheduling communication by the UE with at least one scheduled cell having a same SCS as an SCS of the scheduling cell;
lower SCS scheduling comprising the control channel scheduling communication by the UE with at least one scheduled cell having a lower SCS than the SCS of the scheduling cell; and
higher SCS scheduling comprising the control channel scheduling communication by the UE with at least one scheduled cell having a higher SCS than the SCS of the scheduling cell; and
communicating with the UE according to the one or more sets of UE capabilities.

12. The method of claim 11, wherein the one or more sets of UE capabilities comprises a separate set of UE capabilities for each of same SCS scheduling, lower SCS scheduling, and higher SCS scheduling.

13. The method of claim 11, wherein the one or more sets of UE capabilities comprises a first set of UE capabilities for both same SCS scheduling and lower SCS scheduling and a second set of UE capabilities for higher SCS scheduling.

14. The method of claim 11, wherein the one or more sets of UE capabilities indicates a first number of supported spans per slot of the scheduling cell for same SCS scheduling and a second number of supported spans per slot for lower SCS scheduling, wherein the second number is less than or equal to the first number.

15. The method of claim 11, wherein the one or more sets of UE capabilities indicates a first number of supported spans per slot of the scheduling cell for higher SCS scheduling and a second number of supported spans per slot for same SCS scheduling, wherein the second number is less than or equal to the first number.

16. The method of claim 11, wherein the one or more sets of UE capabilities indicates a first number of supported DCIs for same SCS scheduling and a second number of supported DCIs for lower SCS scheduling, wherein the second number is less than or equal to the first number.

17. The method of claim 16, wherein the second number is equal to the first number.

18. The method of claim 11, wherein the one or more sets of UE capabilities indicates a first number of supported DCIs for higher SCS scheduling and a second number of supported DCIs for same SCS scheduling, wherein the second number is less than or equal to the first number.

19. The method of claim 11, wherein each of the one or more sets of UE capabilities indicating the number of supported DCIs in the control channel per span per scheduled cell comprises each of the one or more sets of UE capabilities indicating one or more of:
a number of supported DCIs in the control channel per span per scheduled cell for downlink scheduling for frequency division duplex (FDD) communication;
a number of supported DCIs in the control channel per span per scheduled cell for uplink scheduling for FDD communication;
a number of supported DCIs in the control channel per span per scheduled cell for downlink scheduling for time division duplex (TDD) communication; or
a number of supported DCIs in the control channel per span per scheduled cell for uplink scheduling for TDD communication.

20. The method of claim 11, wherein the number of supported DCIs comprises one of:
a number of unicast DCIs scheduling downlink; and
a number of unicast DCIs scheduling uplink.

21. A user equipment (UE) comprising:
a memory; and
a processor coupled to the memory, the processor and memory being configured to:
signal to a serving cell one or more sets of UE capabilities of the UE, each of the one or more sets of UE capabilities indicating a number of supported spans per slot of a scheduling cell for monitoring a control channel transmitted by the scheduling cell for scheduling one or more of uplink or downlink communication by the UE with one or more scheduled cells, each of the one or more sets of UE capabilities further indicating a number of supported downlink control indicators (DCIs) in the control channel per span per scheduled cell, the one or more sets of UE capabilities being for each of:
same sub-carrier spacing (SCS) scheduling comprising one or more of the control channel scheduling communication by the UE with the scheduling cell or the control channel scheduling communication by the UE with at least one scheduled cell having a same SCS as an SCS of the scheduling cell;
lower SCS scheduling comprising the control channel scheduling communication by the UE with at least one scheduled cell having a lower SCS than the SCS of the scheduling cell; and
higher SCS scheduling comprising the control channel scheduling communication by the UE with at least one scheduled cell having a higher SCS than the SCS of the scheduling cell; and
monitor the control channel according to the one or more sets of UE capabilities.

22. The UE of claim 21, wherein the one or more sets of UE capabilities comprises a separate set of UE capabilities for each of same SCS scheduling, lower SCS scheduling, and higher SCS scheduling.

23. The UE of claim 21, wherein the one or more sets of UE capabilities comprises a first set of UE capabilities for both same SCS scheduling and lower SCS scheduling and a second set of UE capabilities for higher SCS scheduling.

24. The UE of claim 21, wherein the one or more sets of UE capabilities indicates a first number of supported spans per slot of the scheduling cell for same SCS scheduling and a second number of supported spans per slot for lower SCS scheduling, wherein the second number is less than or equal to the first number.

25. The UE of claim 21, wherein the one or more sets of UE capabilities indicates a first number of supported spans per slot of the scheduling cell for higher SCS scheduling and a second number of supported spans per slot for same SCS scheduling, wherein the second number is less than or equal to the first number.

26. A serving cell of a network comprising one or more cells serving a user equipment (UE), the serving cell comprising:
   a memory; and
   a processor coupled to the memory, the processor and memory being configured to:
      receive signaling of one or more sets of UE capabilities of the UE, each of the one or more sets of UE capabilities indicating a number of supported spans per slot of a scheduling cell for monitoring a control channel transmitted by the scheduling cell for scheduling one or more of uplink or downlink communication by the UE with one or more scheduled cells, each of the one or more sets of UE capabilities further indicating a number of supported downlink control indicators (DCIs) in the control channel per span per scheduled cell, the one or more sets of UE capabilities being for each of:
         same sub-carrier spacing (SCS) scheduling comprising one or more of the control channel scheduling communication by the UE with the scheduling cell or the control channel scheduling communication by the UE with at least one scheduled cell having a same SCS as an SCS of the scheduling cell;
         lower SCS scheduling comprising the control channel scheduling communication by the UE with at least one scheduled cell having a lower SCS than the SCS of the scheduling cell; and
         higher SCS scheduling comprising the control channel scheduling communication by the UE with at least one scheduled cell having a higher SCS than the SCS of the scheduling cell; and
      communicate with the UE according to the one or more sets of UE capabilities.

27. The serving cell of claim 26, wherein the one or more sets of UE capabilities comprises a separate set of UE capabilities for each of same SCS scheduling, lower SCS scheduling, and higher SCS scheduling.

28. The serving cell of claim 26, wherein the one or more sets of UE capabilities comprises a first set of UE capabilities for both same SCS scheduling and lower SCS scheduling and a second set of UE capabilities for higher SCS scheduling.

29. The serving cell of claim 26, wherein the one or more sets of UE capabilities indicates a first number of supported spans per slot of the scheduling cell for same SCS scheduling and a second number of supported spans per slot for lower SCS scheduling, wherein the second number is less than or equal to the first number.

30. The serving cell of claim 26, wherein the one or more sets of UE capabilities indicates a first number of supported spans per slot of the scheduling cell for higher SCS scheduling and a second number of supported spans per slot for same SCS scheduling, wherein the second number is less than or equal to the first number.

* * * * *